(12) United States Patent
Ahn et al.

(10) Patent No.: US 7,232,598 B2
(45) Date of Patent: Jun. 19, 2007

(54) SUPER RESOLUTION OPTICAL DISC

(75) Inventors: Kun Ho Ahn, Seoul (KR); Keum Cheol Kwak, Seoul (KR); Jin Hong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 10/971,332

(22) Filed: Oct. 21, 2004

(65) Prior Publication Data

US 2005/0170133 A1 Aug. 4, 2005

(30) Foreign Application Priority Data

| Oct. 22, 2003 | (KR) | 10-2003-0073915 |
| Dec. 30, 2003 | (KR) | 10-2003-0100184 |
| Jan. 18, 2004 | (KR) | 10-2004-0001132 |

(51) Int. Cl.
*B32B 3/02* (2006.01)

(52) U.S. Cl. .................. 428/64.4; 428/64.5; 428/64.6; 430/270.13

(58) Field of Classification Search ............... 428/64.4, 428/64.5, 64.6; 430/270.13
See application file for complete search history.

(56) References Cited

U.S. PATENT DOCUMENTS

| 6,524,766 | B1 * | 2/2003 | Ariyoshi et al. | 430/270.13 |
| 6,896,946 | B2 * | 5/2005 | Chen | 428/64.1 |
| 2004/0161575 | A1 * | 8/2004 | Hwang et al. | 428/64.8 |
| 2004/0219455 | A1 * | 11/2004 | Tseng et al. | 430/270.11 |
| 2004/0257968 | A1 * | 12/2004 | Kim et al. | 369/275.2 |
| 2005/0009260 | A1 * | 1/2005 | Kim et al. | 438/202 |
| 2005/0079313 | A1 * | 4/2005 | Kim et al. | 428/64.4 |
| 2005/0106351 | A1 * | 5/2005 | Hwang et al. | 428/64.4 |
| 2005/0117507 | A1 * | 6/2005 | Hwang et al. | 369/275.4 |
| 2005/0259563 | A1 * | 11/2005 | Ahn et al. | 369/283 |

FOREIGN PATENT DOCUMENTS

| JP | 08-185642 | 7/1996 |
| KR | 1020030002590 | 1/2003 |
| WO | WO 03/098620 | 11/2003 |

* cited by examiner

*Primary Examiner*—Bruce H. Hess
(74) *Attorney, Agent, or Firm*—Lee, Hong, Degerman, Kang & Schmadeka

(57) ABSTRACT

Disclosed is a super resolution optical disc. The super resolution optical disc comprises at least two mask layers. In one embodiment, the super resolution optical mask comprises a plurality of mask layers and impact absorption layers between the mask layers, and may further comprise diffusing prevention layers between the mask layer and the impact absorption layer. In another embodiment, the super resolution optical mask comprises a plurality of recording layers and dielectric layers separating the recording layers, each of the recording layers including two mask layers and an impact absorption layer between the mask layers or including two mask layers, an impact absorption layer between the mask layers, and diffusion preventing layers between the mask layer and the impact absorption layer. Accordingly, recording marks have an enhanced shape at an outer periphery of the marks, thereby enhancing the quality of the reproduction signal and enabling high-density multi-level recording.

16 Claims, 10 Drawing Sheets

FIG. 4
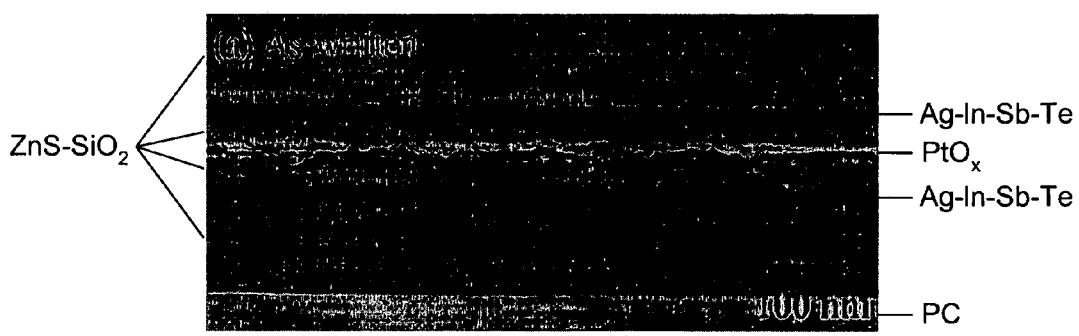
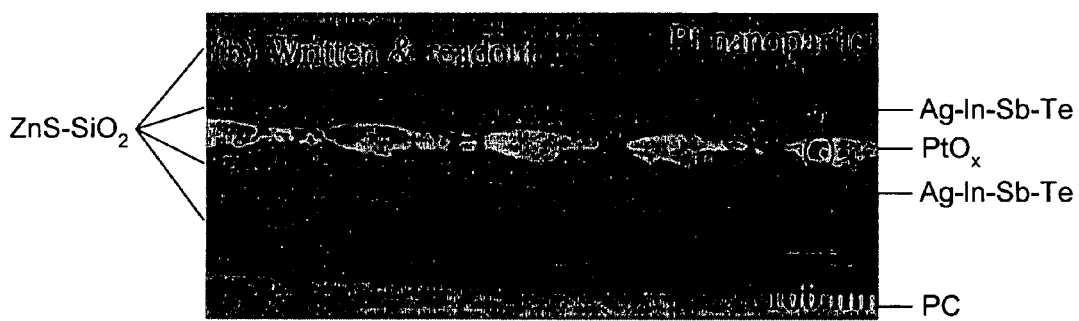

FIG. 5-a
(a)
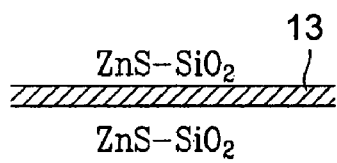
(b)
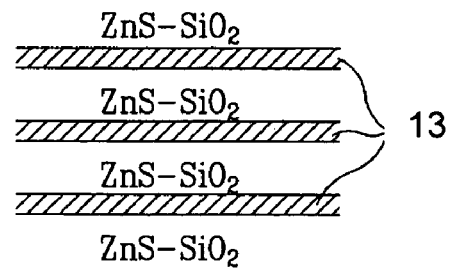
FIG. 5-b
(a)
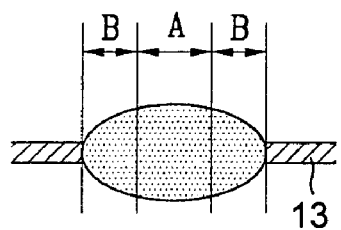
(b)
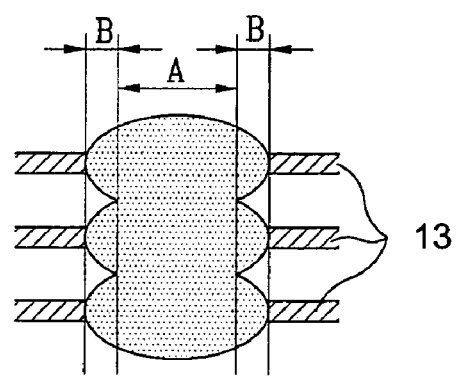
FIG. 5-c
(a)
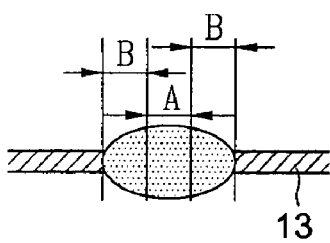
(b)
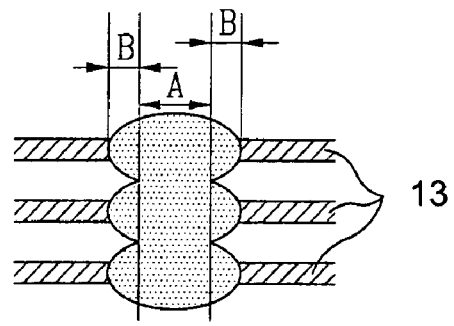

FIG. 6
(a)
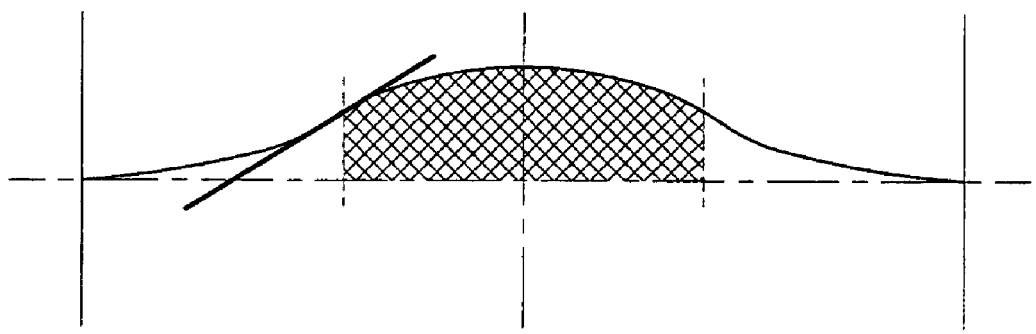
(b)
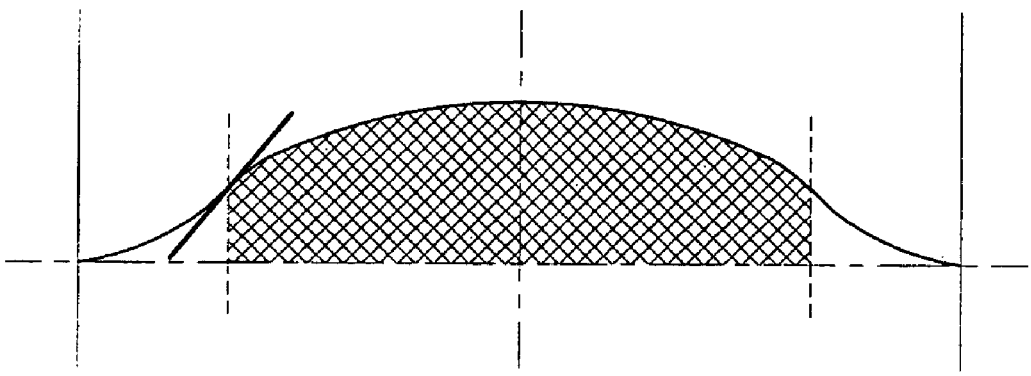

SUPER RESOLUTION OPTICAL DISC

CROSS-REFERENCE TO RELATED APPLICATIONS

Pursuant to 35 U.S.C. § 119(a), this application claims the benefit of earlier filing date and right of priority to the Korean Patent Application Nos. 10-2003-73915, 10-2003-100184 and 10-2004-1132 filed on Oct. 22, 2003, Dec. 30, 2003 and Jan. 8, 2004, the contents of which are hereby incorporated by reference herein in its entirety.

BACKGROUND OF THE INVENTION

1. Field of the Invention

The present invention relates to an optical recording media, and more particularly to an ultra-high resolution optical disc, which has enhanced signal quality and enhanced recording density.

2. Description of the Related Art

Generally, currently available optical discs have a storage capacity of about 4.7 GB (gigabytes) in the DVD (Digital Versatile Disc) standard using red laser or of about 25 GB in the BD (Blue-ray Disc) standard using blue laser, which has been commercialized recently. However, in order to record and reproduce a huge amount of information for applications, such as high definition TV or E-medicine, there is a need to provide an information storage technology with a higher density.

For instance, in order to record a data stream of high definition digital video, recently available on the market, there is a need to provide a storage media, which has a storage capacity of 20 GB or more and is able to record the data at a speed of 25 Mbps or more.

Moreover, it is anticipated that technology capable of recording 100 GB or more of information on CD-size media will be required after 2005 and technology capable of recording terabytes of information on CD-size media will be required after 2010. For this purpose, it is necessary to record the information at a high density and a high speed.

In such various multimedia environments, research and development of various types of multi-functional information storage technology has been conducted.

Among the information storage technologies, optical recording technology is most spotlighted and widely used due to its merits. Specifically, an optical recording media is capable of being detached from its drivers, and storing a large amount of information data. As a necessary function in the multimedia environment, random access of data on the optical recording media is allowed in the optical recording technology. Further, high data integrity and low manufacturing costs are provided.

As a method for increasing the recording density of the optical recording media, a method of decreasing the magnitude of the laser beam incident on the recording media is used. As developed at present, the reduction of the magnitude of the laser beam incident on the recording media is accomplished by decreasing the wavelength of the laser or increasing a numerical aperture of an objective lens. The magnitude of bits recorded on the media is in proportion to the wavelength of the laser, and is in inverse proportion to a numerical aperture (NA) of an objective lens.

However, currently, methods for increasing recording density by using a short wavelength, such as a blue laser (405 nm), together with a high numerical aperture (NA=0.85), has substantially arrived at the theoretical limits of optics. Accordingly, there is a need to develop a new technology for realizing a higher storage capacity.

Accordingly, as a plan for developing an optical memory, which is compatible with the existing CD or DVD and is also capable of storing information with a density several hundreds times higher than the storage capacity of the existing CD, that is, 650 MB, research into an optical disc using a super resolution phenomenon has been conducted.

It is expected that the super resolution technology can remarkably reduce the size of a recording mark while using a conventional laser optical pickup system, thereby increasing the recording density.

Among the super resolution technologies, according to a WORM (Write Once Read Many)-type super resolution technology, recording marks are not formed on a crystal/non-crystal reversible phase transformation-type recording layer available for the DVD. Instead, an oxide thin film, such as $AgO_x$, $PtO_x$ and the like, of a mask layer in a recordable optical disc is decomposed by laser light, and cavities formed from the decomposition and nano-size metal particles precipitated in the mask layer act as a recording layer while acting as scattering cores.

Here, dielectric thin films consisting of a $ZnS-SiO_2$ based component are formed at upper and lower portions of the oxide thin film of the mask layer, respectively, in consideration of optical, thermal, and mechanical properties of the oxide thin film. Further, as for a substrate, polycarbonate (PC) is mainly used, since PC is light, has good injection properties, and can increase carrier-to-noise ratio (CNR) due to a low birefringence when the laser is incident thereon.

FIG. 1 is a view illustrating the structure of a conventional super resolution optical disc. As shown in FIG. 1, the conventional super resolution optical disc comprises a substrate 11 consisting of polycarbonate and having a thickness of 0.6 mm, a first dielectric layer 12 consisting of $ZnS-SiO_2$ and having a thickness of 130 nm, a mask layer 13 consisting of $PtO_x$ and having a thickness of 4 nm, a second dielectric layer 14 consisting of $ZnS-SiO_2$ and having a thickness of 40 nm, a recording layer 15 consisting of Ag—In—Sb—Te and having a thickness of 60 nm, and a dielectric layer 16 consisting of $ZnS-SiO_2$ and having a thickness of 100 nm, which are sequentially laminated in this order.

By irradiating the laser beam on the super resolution optical disc, the thermally decomposed marks are locally recorded in the thin film laminated on a groove or a land, and by irradiating a low power laser thereon, a signal caused by difference of reflection rate between the mark and the background (space), which is not formed with the marks, is detected.

At this time, a jitter value becomes an important standard for demonstrating a reproduction quality. The jitter value is an amount represented by a statistical variation of the values of time differences between a clock (PLL clock) generated from a reproduction signal and a border of each recording mark determined from the reproduction signal. Specifically, the jitter value is a value represented by a percentage of the standard deviation of the values of time differences between a start portion of the mark and the PLL clock and between an end portion of the mark and the PLL clock, divided by 1 T.

Although there are various causes influencing the jitter value and various aspects influencing the jitter value are not simple, especially, Inter-Symbol Interference (ISI) caused by relation between a shape of the mark recorded on the recording media and a space between the marks plays a very important role in influencing the jitter value. That is, in a process for analyzing the signal read by a pickup unit, the relation between the shape of the mark recorded on the recording media and the space between the marks determines the quality of the reproduction signal. Accordingly, it is very important to provide a technology which can record the marks on the recording media with a desired shape in order to reduce the jitter value by improving the quality of the reproduction signal.

According to research into the conventional single mask layer, as shown in FIG. 2, the mask layer, which is several nanometer thick, [for example, PtOx (4 nm)] is expanded to have a thickness of ten times or more through the recording process, and continues to expand through the reproduction process after recording. An expanded portion is a Ge—Sb—Te or Ag—In—Sb—Te thin film layer, which is used as a recording layer in a typical phase transformation type optical disc. The expansion is attributed to the fact that the mask layer is decomposed by the focused laser beam and a phase transformation material having a low melting point is partially melted or decreased in viscosity, thereby causing the mask layer to easily expand toward the melted phase transformation material.

Further, as shown in FIG. 3, in case of a super resolution optical disc 101, which has a symmetrical structure of a dielectric layer (for example, ZnS—SiO$_2$) and a recording layer (for example, Ag—In—Sb—Te) at upper and lower portions of the mask layer (for example, PtO$_x$), each mark in the mask layer is expanded into an oval-shape.

FIG. 4 shows that the mask layer is expanded during the recording process and that the mask layer continues to expand during the reproduction process after the recording process.

Here, since the laser beam has a temperature variation corresponding to a Gaussian distribution at the cross section thereof, there is a considerable difference of volume expansion between the center of the recording marks and an outer periphery thereof, and the degree of volume expansion is gradually decreased toward the outer periphery of the recording marks.

Due to such a non-uniform expansion of the mask layer, the recording marks are not uniform, and the reflection rate differs between the center of the marks and the outer periphery thereof. Moreover, the border between the outer periphery of the marks and the space between the marks is poorly defined. Accordingly, there are problems in that the quality of the reproduction signal of the optical disc is lowered and in that integrity of reproduction performance cannot be secured.

Moreover, although there have been continuous efforts to increase the storage capacity of the super resolution optical disc, an effective solution for this problem has not been discovered yet.

SUMMARY OF THE INVENTION

The present invention has been made to solve the above problems, and it is an object of the present invention to provide an optical disc, which employs a plurality of mask layers to enhance the shape of an outer periphery of each recording mark, thereby enhancing quality of a reproduction signal.

It is further object of the present invention to provide an optical disc, which is formed with an impact absorption layer between the mask layers to enhance the shape of the outer periphery of each mark, thereby enhancing the quality of the reproduction signal.

It is another object of the present invention to provide an optical disc, which is enhanced in the shape of the outer periphery of each mark, thereby enhancing the quality of the reproduction signal.

It is another object of the present invention to provide an optical disc, which can reduce laser light irradiation time, thereby increasing the record speed.

It is yet another object of the present invention to provide an optical disc, which is laminated with a plurality of recording layers, each consisting of two mask layers and an impact absorption layer between the mask layers, thereby enabling high density recording by using multi-level recording.

In accordance with one aspect of the present invention, the above and other objects can be accomplished by the provision of a super resolution optical disc, comprising a substrate, a first dielectric layer, a first recording layer, a second dielectric layer, at least two mask layers, a third dielectric layer, a second recording layer, a fourth dielectric layer and a preservation layer, sequentially laminated thereon.

Preferably, each of the mask layers consists of a metallic compound comprising O$_x$ or N$_x$. The mask layers may be separated from each other with the dielectric layer formed between the mask layers, respectively. Each of the dielectric layers may consist of at least one material selected from ZnS—SiO$_2$ and SiN$_x$.

In accordance with another aspect of the present invention, there is provided a super resolution optical mask, comprising a plurality of mask layers, and impact absorption layers of phase transformation material for a recording layer formed between the mask layers.

The impact absorption layer may consist of the phase transformation material having a low melting point. Further, the super resolution optical mask may further comprise diffusion preventing layers between the mask layer and the impact absorption layer, and the diffusion preventing layer may consist of at least one material selected from ZnS, SiO$_x$, GeN and SiN$_x$.

In accordance with yet another aspect of the present invention, there is provided a super resolution optical mask, comprising a plurality of recording layers, and dielectric layers separating the recording layers from each other, each of the recording layers consisting of two mask layers and an impact absorption layer of phase transformation material for the recording layer formed between the mask layers. Further, the super resolution optical mask may further comprise diffusion preventing layers between the mask layer and the impact absorption layer.

BRIEF DESCRIPTION OF THE DRAWINGS

The foregoing and other objects and features of the present invention will be more clearly understood from the following detailed description taken in conjunction with the accompanying drawings, in which:

FIG. 4 is micrographs illustrating states wherein a mask layer of the conventional super resolution optical disc is expanded immediately after recording and through a reproduction process after recording, respectively;

FIGS. 5a to 5c are views of mask layers, in which (a) of FIGS. 5a to 5c illustrate a single mask layer of a super resolution optical disc according to the prior art, and in which (b) of FIGS. 5a to 5c illustrate a plurality of mask layers of a super resolution optical disc according to a first embodiment of the present invention;

FIGS. 6a and 6b are representations of an optical performance of the mask, such as the reflection rate, in which FIG. 6a represents the optical performance of the mask when using the single mask layer of the super resolution optical disc according to the prior art, and in which FIG. 6b represents the optical performance of the mask when using the multi layer masks;

DETAILED DESCRIPTION OF PREFERRED EMBODIMENTS

Figure 1:
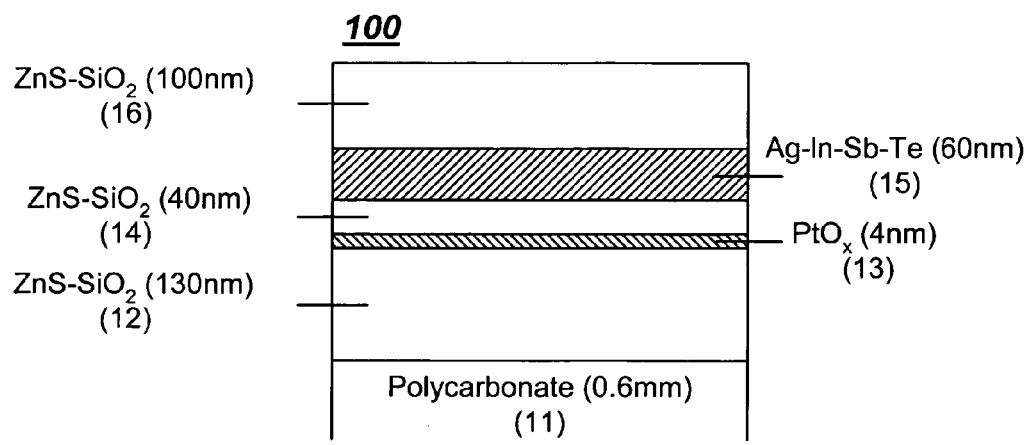
FIG. 1 is a view illustrating the structure of a conventional super resolution optical disc.

Preferred embodiments will now be described in detail with reference to the accompanying drawings.

FIGS. 5a to 5c are views of mask layers, in which (a) of FIGS. 5a to 5c illustrate a single mask layer of a super resolution optical disc according to the prior art, and in which (b) of FIGS. 5a to 5c illustrate a plurality of mask layers of a super resolution optical disc according to a first embodiment of the present invention.

Further, FIG. 5a schematically shows the structure of a recordable optical disc consisting of a thin film or thin films as the mask layer in the super resolution optical disc. FIGS. 5b and 5c schematically show the structure of the optical disc after laser light is irradiated on the mask layer in the super resolution optical disc.

In order to increase the quality of a reproduction signal, each recording mark must be thick. Accordingly, it is desirable to provide a thick mask layer, which is used for recording a signal. However, as the mask layer becomes thicker, volume expansion caused by thermal decomposition is also increased, causing an increase of stress accompanied with problems in endurance of the disc and in stability of the signal.

Thus, in order to form thick mask layers 13 having a total thickness of 20 nm or more, as shown in (b) of FIG. 5a, a lamination structure comprising a first dielectric layer/a first mask layer/a second dielectric layer/a second mask layer/a third dielectric layer/a third mask layer/a forth dielectric layer/a forth mask layer laser/a fifth dielectric layer is formed. That is, the mask layer of the present invention is formed as a multi-layer structure such that the respective mask layers are separated from each other with a dielectric layer formed between the mask layers.

Here, each of the mask layers 13 consists of a metallic compound ($MO_x/MN_x$) comprising $O_x$ or $N_x$, which is easily decomposed into nano-size metallic particles and gas when heating the mask layer at a predetermined temperature or more. As for the dielectric layers, $ZnS—SiO_2$ or $SiN_x$ is used.

Generally, when recording data on the mask layers, the mask layers are locally decomposed into nano-size metallic particles and oxygen or nitrogen by the write laser beam, forming recording marks having a size of a diffraction limit or less. Further, when reproducing the recording marks, there is a near-field effect generated from the nano-size metallic particles by the laser beam having a low energy, and a rapid variation in diffraction rate in cavities of oxygen or nitrogen, thereby proving the reproduction signal.

In the embodiment of (b) in FIG. 5a, when the laser light is locally irradiated on the plurality of mask layers, each of the thin films of platinum (or silver) oxide (or nitride) constituting each of the mask layers is decomposed into platinum (or silver), which is the nano-size metallic particles, and oxygen (or nitrogen) cavities as the gas, and is subjected to a rapid volume expansion, as shown in (b) of FIG. 5b.

At this time, a region practically contributing to generation of the reproduction signal among the expanding mark is the central region A of each recording mark, and an outer peripheral region B of the mark elongated in the direction of signal recording does not practically contribute to generation of the reproduction signal.

Meanwhile, when comparing (a) and (b) of FIG. 5b, it can be seen that the outer peripheral region B of the mark, generated when the plurality of mask layers 13 are formed as shown in (b) of FIG. 5b, has a reduced size ½ or less that of the outer peripheral region B of the mark, generated when the single mask layer 13 is formed as shown in (b) of FIG. 5b.

Accordingly, it can be seen that when using the plurality of mask layers 13 as shown in (b) of FIG. 5b rather than the plurality of mask layers 13 as shown in (a) of FIG. 5b, influence on the signal from the outer peripheral region B of the mark is relatively reduced and a signal contribution region A is not only increased but also well defined. As a result, the slope of an RF signal at the border between a recording mark and a space between the recording marks becomes steeper, whereby a jitter value is reduced.

Generally, with regard to the quality of the RF signal measured from the optical disc, the leading edge and the trailing edge of each mark play an important role. If the mark is well defined at the outer periphery of the mark, the difference of the reflection rate between the outer periphery of the mark and the space is increased, and the slope of the RF signal measured at the border between the mark and the space becomes steeper, thereby providing an improved jitter value of the RF signal.

FIGS. 6a and 6b are representations of the optical performance of the mask, such as the reflection rate, in which FIG. 6a represents the optical performance of the mask when using the single mask layer of the super resolution optical disc according to the prior art, and in which FIG. 6b represents the optical performance of the mask when using the plurality of mask layers of the present invention.

As shown in FIG. 6a, when using the single mask layer, the reflection rate is high at the center of the mark, while the reflection rate is gradually decreased toward the outer periphery of the mark. Such an optical performance influences ISI (Inter-Symbol Interference), causing reduction in quality of the RF signals.

However, as shown in FIG. 6a, when forming the plurality of mask layers, the optical performance, such as the reflection rate, causes a steep slope at the outer periphery of the recording mark. As a result, it is anticipated that when forming the plurality of mask layers, the reflection rate is substantially higher than when using a single mask layer, and that the reflection rate is rapidly decreased from the center of the mark to the outer periphery thereof.

Accordingly, the quality of the RF signals is enhanced at the border between the mark and the space, and a thermal stability is also remarkably enhanced due to the uniform shape of the marks.

As a result what is described above, even if the laser light is irradiated only for a short period of time as shown in FIG. 5c, a stable carrier to noise ratio (CNR) is achieved.

According to another embodiment of the present invention, a super resolution optical mask comprises a plurality of mask layers and impact absorption layers, which consists of phase transformation material for a recording layer, between the mask layers. The super resolution optical mask may further comprise diffusion preventing layers between each of the mask layers and the impact absorption layer.

Each of the mask layers may consist of a metallic compound ($MO_x$ or $MN_x$) comprising $O_x$ or $N_x$, which is easily decomposed into nano-size metallic particles and gas when heating the mask layer at a predetermined temperature or more. For the impact absorption layer, a phase transformation material for the recording layer having a low melting point, such as Ge, Sb, Te, Ag, In, Sn, Zn, Pb, Bi, Ti, Se, S, Al, Ga, Cd, I or the like, can be used.

Further, the diffusion preventing layer may consist of ZnS, $SiO_x$, GeN, $SiN_x$ or the like. The dielectric layer, which separates the plurality of recording layers, may consist of ZnS—$SiO_2$ or $SiN_x$.

The structure of a super resolution optical disc according to the present invention will be described in detail as follows.

Figure 7:
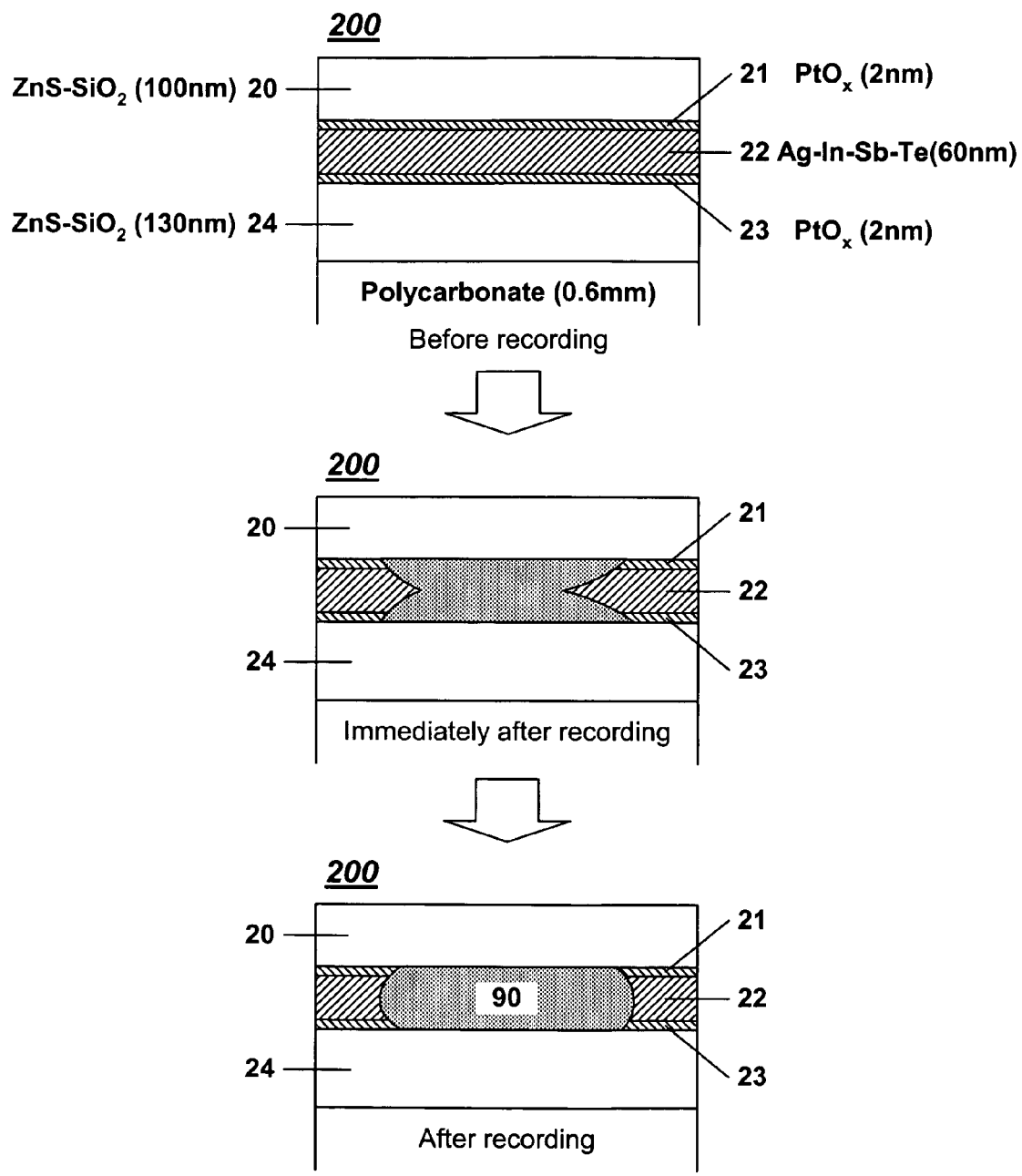
FIG. 7 is a view illustrating the structure of a super resolution optical disc according to a second embodiment of the present invention.

FIG. 7 is a view illustrating the structure of a super resolution optical disc according to a second embodiment of the present invention.

A super resolution optical disc 200 comprises a dielectric layer 20, mask layers 21 and 23, and an impact absorption layer 22, in which materials and thickness of the respective layers can be optionally varied for enhancing optical characteristics according to embodiments.

Meanwhile, each of the mask layers 21 and 23, used for recording a signal, is thermally decomposed into nano-size metal particles and oxygen or nitrogen at a portion thereof, and is then subjected to a rapid volume expansion. Here, an impact absorption layer having a relatively low melting point around the mask layers, that is, the impact absorption layer 22, which is used as phase transformation material for a recording layer in a phase transformation type optical disc, is melted or decreased in viscosity by the write laser beam, thereby playing a sufficient role of contributing to the volume expansion of the mask layer.

Figure 2:
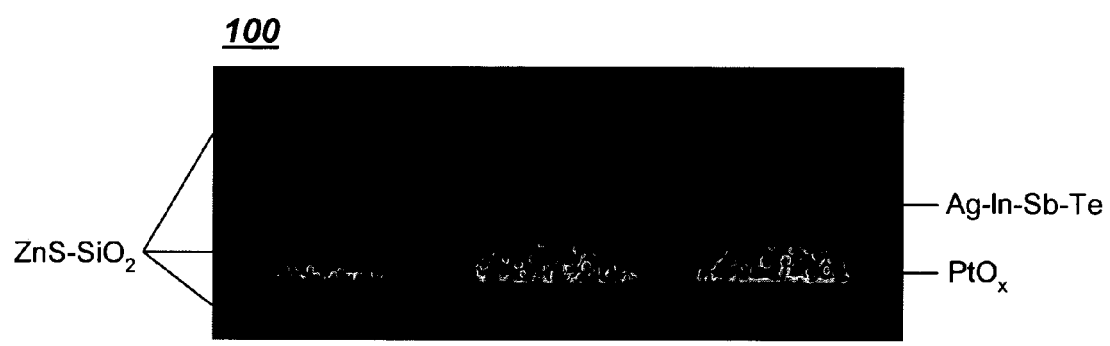
FIGS. 2 and 3 are pictures of the conventional super resolution optical disc taken using a transmission electron microscope, respectively.
Figure 3:

As shown in FIG. 2, in the case where a thin film serving as the impact absorption layer is formed at only one side, the volume expansion occurs in that direction. Moreover, as shown in FIG. 3, in the case where the thin films serving as the impact absorption layer are formed at both sides of the mask layer with the dielectric layers interposed between the mask layer and the thin film, the volume expansion also occurs symmetrically. As a result, the recording mark cannot have a shape, which enhances characteristics of a reproduced RF signal.

On the contrary, in the super resolution optical disc 200 according to the present invention, as shown in FIG. 7, since the impact absorption layer 22 is provided between the two mask layers 21 and 23, the recording mark takes a shape which can enhance the characteristics of the reproduced RF signal.

Immediately after recording, the two mask layers 21 and 23 are thermally decomposed by the write laser beam, and rapidly expand toward the impact absorption layer 22. Then, at a predetermined time after recording, the mask layers 21 and 23 are rapidly expanded in volume thereof and meet each other while pushing the impact absorption layer 22 up and down and generating oxygen or nitrogen, which pushes the impact absorption layer 22 outward laterally with a higher pressure. As a result of repeated explosive volume expansion, final recording marks 90 taking a shape, which enhances the characteristics of the reproduced RF signal, are formed.

Figure 8:
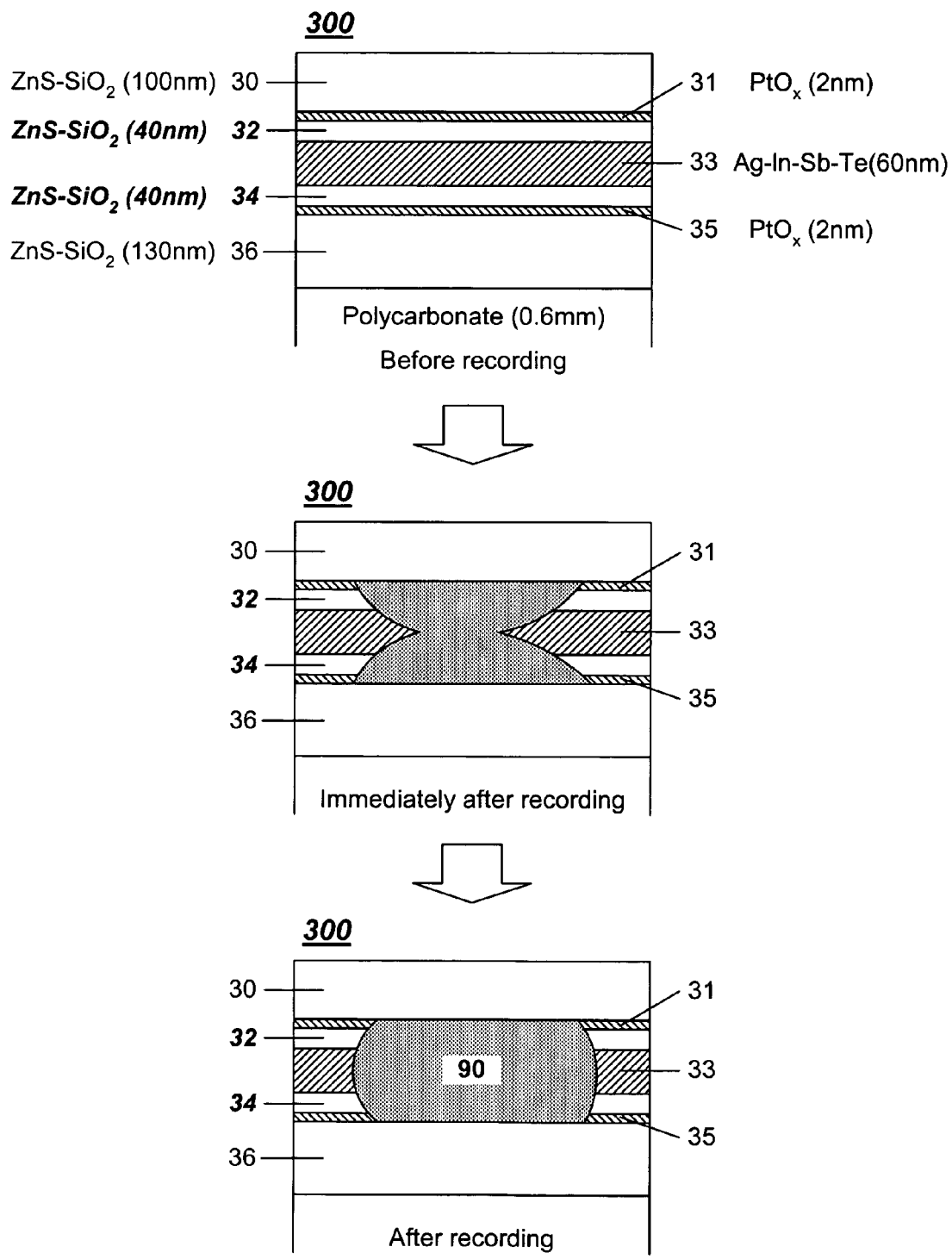
FIG. 8 is a view illustrating the structure of a super resolution optical disc according to a third embodiment of the present invention.

As shown in FIG. 8, a super resolution optical disc 300 according to a third embodiment of the present invention comprises two mask layers 31 and 35, an impact absorption layer 33 between the mask layers 31 and 35, and diffusion preventing layers 32 and 34 between each of the mask layers 31 and 35 and the impact absorption layer, respectively.

Figure 9:
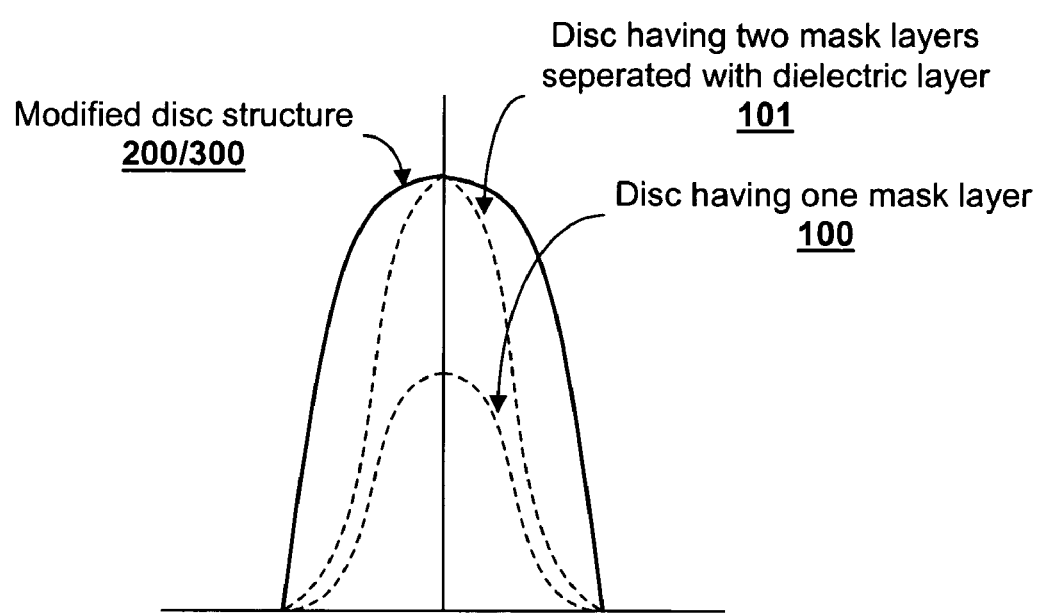
FIG. 9 is a graphical representation comparing reflective characteristics of the super resolution optical discs according to the second and third embodiment of the present invention with the reflective characteristics of the conventional super resolution optical discs.

As shown in FIG. 9, the super resolution optical discs 200 and 300 according to the second and third embodiments of the present invention have a remarkably improved reflection rate (or reproduced RF signal), compared with the reflection rate (or reproduced RF signal) of the conventional super resolution optical disc 100 and 101. Generally, as the slope of the reproduced RF signal measured at the leading edge and the trailing edge of the recording mark gets steeper or variation of the reflection rate at an outer periphery of the recording mark increases, the jitter value of the reproduced RF signal improves.

As shown in FIG. 9, in the case where the single mask layer is used, the reflection rate is high at the center of the recording mark, while the variation of the reflection rate is gradually decreased toward the outer periphery of the recording mark. Such reduction in variation of the reflection rate at the outer periphery of the recording mark influences the inter symbol interference, causing reduction in the quality of the signal.

On the contrary, in the case where a plurality of mask layers with the dielectric layers formed therebetween are provided in order to solve the above problems, the variation of the reflection rate at the outer periphery of the recording mark can be increased. Specifically, compared with the conventional optical disc, the optical disc according to the second and third embodiments of the present invention generally has an increased reflection rate and allows the variation of the reflection rate to be rapidly increased from the center of the mark to the outer periphery thereof.

Accordingly, due to the shape of the recording mark, which is well defined at the border, that is, due to the rapid variation of the reflection rate at the border between the mark and the space, the characteristics of the RF signal can be considerably enhanced, and due to the uniform shape of the recording mark, thermal stability can be ensured.

Figure 10:
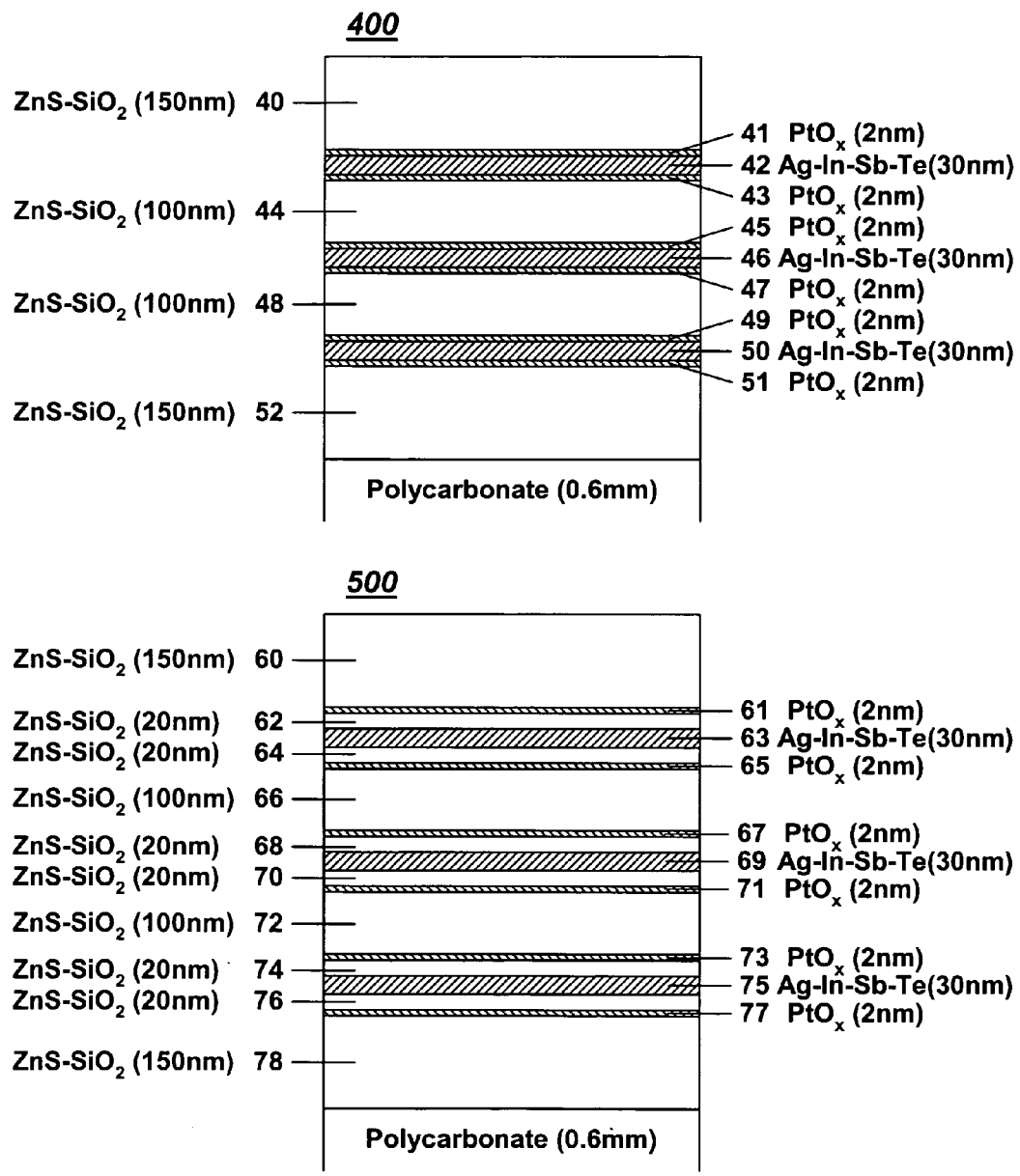
FIG. 10 is a view illustrating the structures of multi-level super resolution optical discs according to forth and fifth embodiments of the present invention.

FIG. 10 shows the structures of multi-level super resolution optical discs according to forth and fifth embodiments of the present invention.

A multi-level super resolution optical disc 400 according to the forth embodiment comprises dielectric layers 40, 44, 48 and 52, mask layers 41, 43, 45, 47, 49 and 51, and impact absorption layers 42, 46 and 50, in which material and thickness of the respective layers can be optionally varied to enhance optical characteristics according to embodiments. As shown in FIG. 10, the multi-level super resolution optical disc 400 comprises a plurality of recording layers separated from each other by the dielectric layers, in which each of the recording layers consists of two mask layers 41 and 43 and the impact absorption layer 42 between the mask layers 41 and 43.

Further, a multi-level super resolution optical disc 500 according to the fifth embodiment comprises dielectric layers 60, 66, 72 and 78, mask layers 61, 65, 67, 71, 73 and 77, impact absorption layers 63, 69 and 75, and diffusion prevention layers 62, 64, 68, 70, 74 and 76, in which material and thickness of the respective layers can be optionally varied to enhance optical characteristics according to embodiments. As shown in FIG. 10, in the multi-level super resolution optical disc 500, the impact absorption layer 63 is formed between two mask layers 61 and 65, and the diffusion prevention layers 62 and 64 are additionally formed between the mask layers 61 and 65 and absorption layer 63, respectively.

Figure 11:
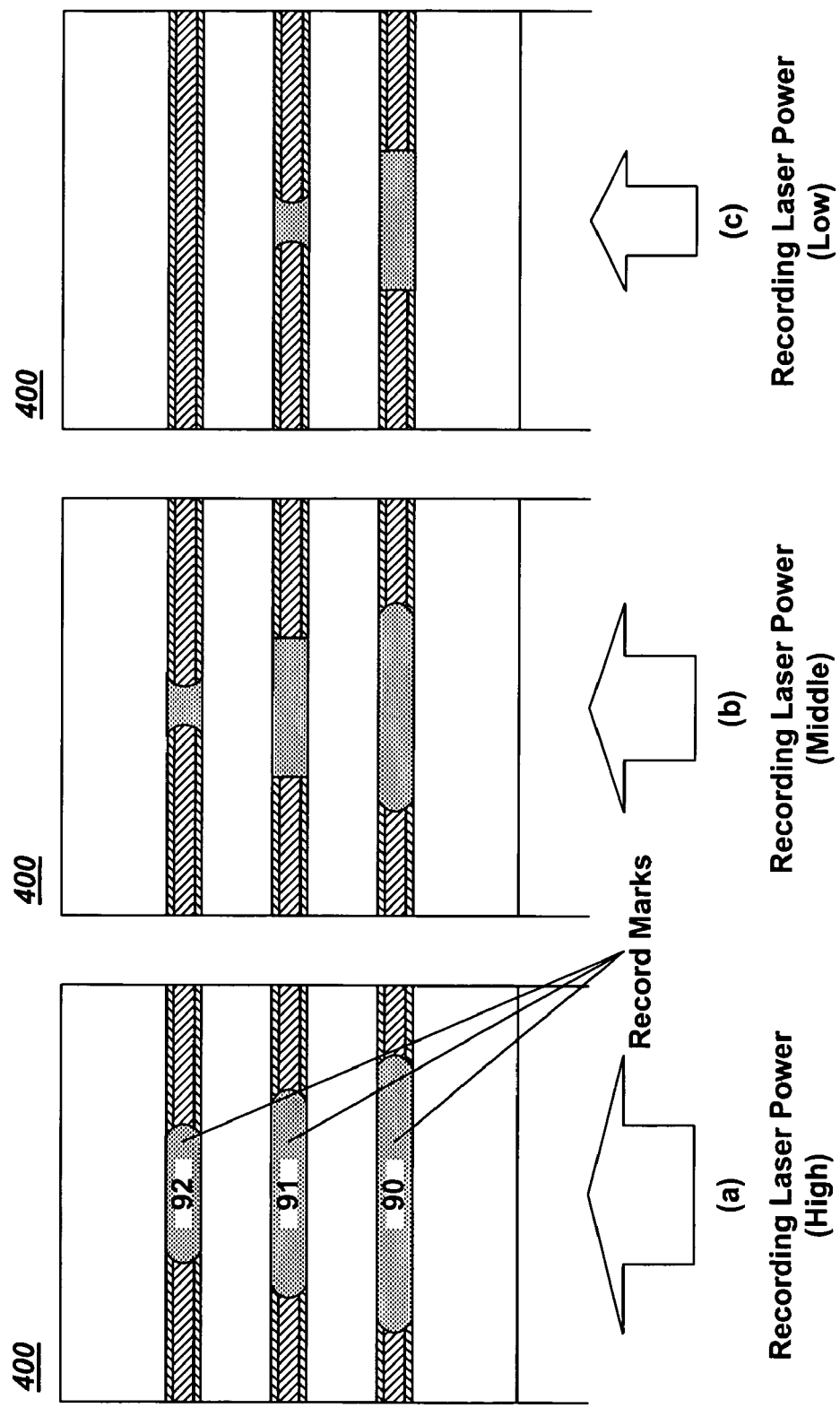
FIG. 11 is a view illustrating shapes of recording marks formed in respective recording layers when laser beams for recording at different powers are irradiated on the multi-level super resolution optical disc according to the forth embodiment of the present invention.

In the forth and fifth embodiments, multi level recording is enabled by energy modulation of the write laser beam. FIG. 11 shows the shapes of recording marks formed in the respective recording layers when the write laser beams at different powers are irradiated on the multi-level super resolution optical disc 400 and 500.

The plurality of recording layers separated from each other by the dielectric layers are recorded with different recording marks 90, 91 and 92, respectively. As for the size of the recording mark, the recording mark 90 formed in a first recording layer nearest to the write laser beam, from among the recording layers, has the largest size, another recording mark 91 formed in a second recording layer nearer to the write laser beam has the next largest size, and the third recording mark 92 formed in a third recording layer farthest from the write laser beam has the smallest size. That is, the recording mark has the largest size in the recording layer, which is toward an incident direction of the write laser beam, and is gradually decreased in size as the distance from the laser beam is increased. This is attributed to the fact that as the write laser beam passes through the recording layers, the energy of the laser beam is gradually decreased, due to the thermal deposition of the mask layer, phase transformation caused by energy absorption at the impact absorption layer, and the like. Further, as the reflection rate of the recording mark is proportional to the size of the recording mark, the reflection rate is also gradually decreased as the distance from the laser beam is increased.

Moreover, as shown in FIG. 11, in the case where the laser beam adjusted to have an intermediate power is irradiated or in the case where the laser beam adjusted to have a low power is irradiated, the recording marks formed in the first to the third recording layers, respectively, are made to have different shapes and the reflection rates of the recording marks also differ, depending on the power of the write laser beam.

The recording marks formed as described above are reproduced by the laser beam of a relatively low power, compared with that of the write laser beam. The amount of reflection at the recording marks due to incidence of the read laser beam is varied depending on the shape and the size of the recording marks. So, a reproduction level for the recording marks formed while being irradiated by the write laser beam for an identical period of time can be varied according to the power of the write laser beam irradiated when recording. Accordingly, with adjustment of the power of the write laser beam, recording marks having different reproduction levels can be recorded and the recording density of the optical disc can be remarkably increased.

Figure 12:
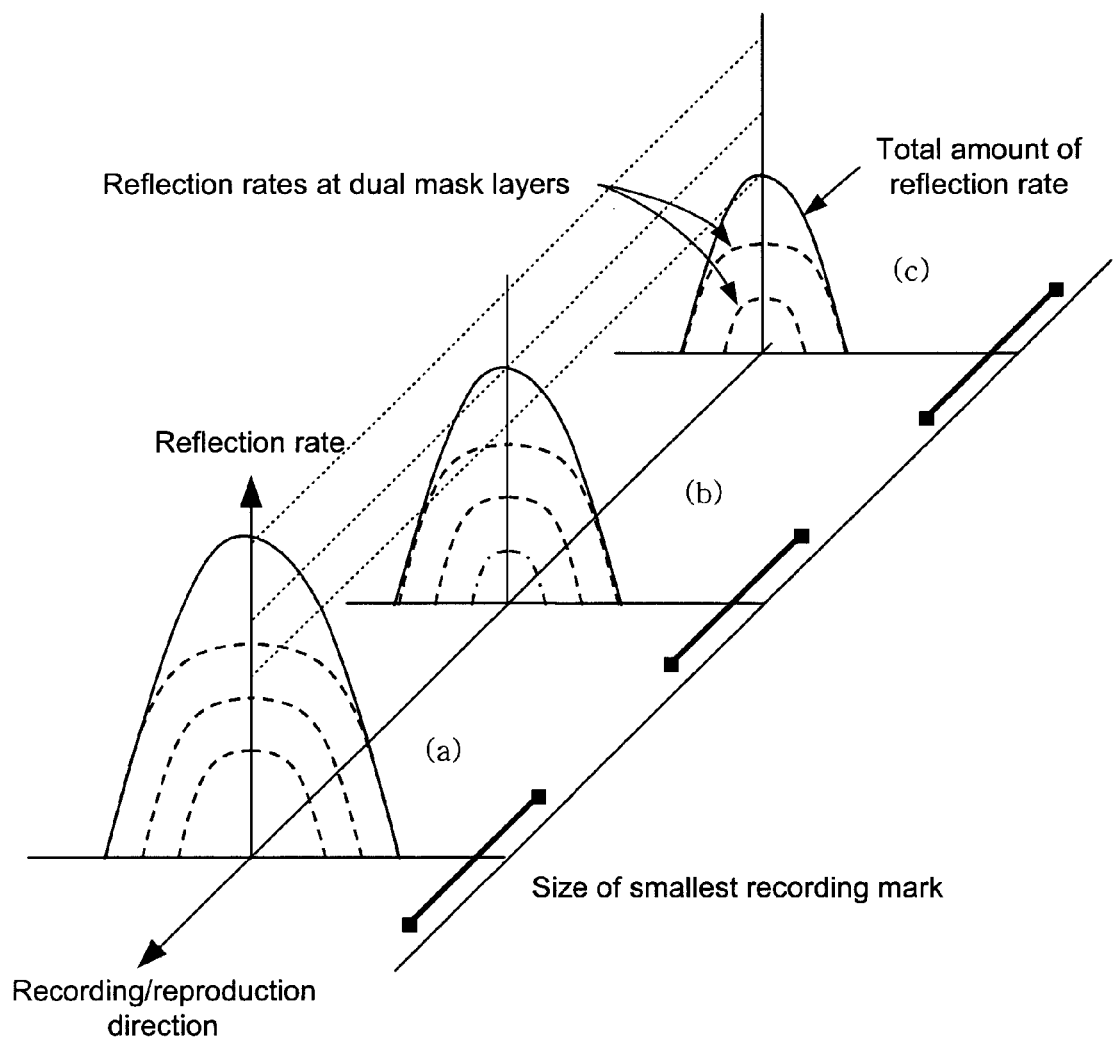
FIG. 12 is a representation depicting reflection rates at the recording marks recorded by the recording laser beams at different levels.

FIG. 12 is a representation depicting a reflection rate or a total reflection amount for recording marks recorded by recording laser beams with different power levels.

As shown in FIG. 12, compared with the cases (b) and (c) in FIG. 2 where the recording marks are recorded by irradiating the write laser beam having a relatively low power, in the case (a) in FIG. 2 where the recording marks are recorded in several layers by irradiating the write laser beam of the highest power, a greater amount of the laser beam is reflected by the read laser beam and the magnitude of the RF signal is increased.

Accordingly, not only the recording mark can be varied in length in the direction of the track on the disc, but also when the recording marks are read by the read laser beam, it is possible to perform not only the existing "0" and "1" recording, but also a multi-level recording, which reproduces the recording marks in multiple levels, for recording marks having an identical length. As a result, the recording density of the optical disc can be greatly increased.

As apparent from the above description, according to the present invention, there are provided advantageous effects in that variation rate of the reflection rate at the outer periphery of the recording mark is increased, the region for enhancing the level of the RF signal at the recording mark is enlarged, and in that the border of the recording mark becomes well defined.

Further, the quality of the reproduced RF signal is enhanced.

Further, the recording marks are further reduced in size, thereby enhancing the recording density.

Further, even if the laser beam is irradiated for only a short period of time when forming the recording marks, a stable CNR is achieved, thereby increasing the record speed.

Further, the different recording marks are formed in the plurality of recording layers by modulating the power of the write laser beam, thereby providing different reflection rates according to the power of the write laser beam for recording marks having an identical length.

Further, high density, multi-level recording is enabled.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A super resolution optical disc, comprising:
   at least two mask layers, and
   an impact absorption layer of phase transformation material for a recording layer formed between the mask layers such that the mask layers are separated from each other by the impact absorption layer.

2. The optical disc as set forth in claim 1, wherein each of the mask layers consists of a metallic compound comprising $O_x$ or $N_x$.

3. The optical disc as set forth in claim 2, wherein each of the mask layers is decomposed into nano-size metallic particles and oxygen or nitrogen when The mask layer is heated at a predetermined temperature or more.

4. The optical disc as set forth in claim 1, further comprising:
dielectric layers formed between The mask layers such That the mask layers are separated from each other with the dielectric layer formed therebetween.

5. The optical disc as set forth in claim 4, wherein the dielectric layer consists of at least one material selected from $ZnS$—$SiO_2$ and $SiN_x$.

6. The optical disc as set forth in claim 1, further comprising:
dielectric layers formed on upper and lower portions of said at least two mask layers, respectively,
wherein each of the dielectric layers consisting of at least one material selected from $ZnS$—$SiO_2$ and $SiN_x$, and The dielectric layer formed on upper portion of said at least two mask layers, or The dielectric layer formed on lower portion of said at least two mask layers, or the dielectric layers formed on upper and lower portions of said at least two mask layers are separated by a recording layer consisting of at least one material selected from Ge, Sb, Te, Ag, In, Sn, Zn, Pb, Bi, Ti, Se, S, Al, Ga, Cd and I, and having a low melting point.

7. A super resolution optical disc, comprising;
at least two mask layers; and
impact absorption layers of phase transformation material for a recording layer formed between the mask layers such that the mask layers are separated from each other by the impact absorption layer,
wherein two mask layers and the impact absorption layer constitute one recording layer, and the optical disc comprises a plurality of recording layers and dielectric layers separating the recording layers from each other.

8. The optical disc as set forth in claim 7, wherein the dielectric layer consists of at least one material selected from $ZnS$—$SiO_2$ and $SiN_x$.

9. The optical disc as set forth in claim 7, wherein the impact absorption layer consists of at least one material, selected from Ge, Sb, Te, Ag, In, Sn, Zn, Pb, Bi, Ti, Se, S, Al, Ga, Cd and I, and has a low melting point.

10. The optical disc as set forth in claim 7, wherein each of the mask layers consists of a metallic compound comprising $O_x$ or $N_x$.

11. A super resolution optical disc, comprising;
at least two mask layers;
impact absorption layers of phase transformation material for a recording layer formed between the mask layers such that the mask layers are separated from each other by the impact absorption layer; and
diffusion prevention layers between the impact absorption layer and the mask layer.

12. The optical disc as set forth in claim 11, wherein two mask layers, the impact absorption layer and the diffusion prevention layers constitute one recording layer, and the optical disc comprises a plurality of recording layers and dielectric layers separating the recording layers from each other.

13. The optical disc as set forth in claim 12, wherein the dielectric layer consists of at least one material selected from $ZnS$—$SiO_2$ and $SiN_x$.

14. The optical disc as set forth in claim 11 or 12, wherein the diffusion prevention layer consists of at least one material selected from $ZnS$, $SiO_x$, GeN, and $SiN_x$.

15. The optical disc as set forth in claim 11 or 12, wherein the impact absorption layer consists of at least one material, selected from Ge, Sb, Te, Ag, In, Sn, Zn, Pb, Bi, Ti, Se, S, Al, Ga, Cd and I, and has a low melting point.

16. The optical disc as set forth in claim 11 or 12, wherein each of the mask layers consists of a metallic compound comprising $O_x$ or $N_x$.

* * * * *